Jan. 17, 1967  W. E. DESMARCHAIS ETAL  3,298,746
MATERIAL HANDLING APPARATUS

Filed Feb. 20, 1964  2 Sheets-Sheet 1

WITNESSES
Theodore F. Wrobel
R. J. Santantonio

INVENTORS
Walter E. Desmarchais
and Hjalmar W.P. Stanhope
BY
ATTORNEY

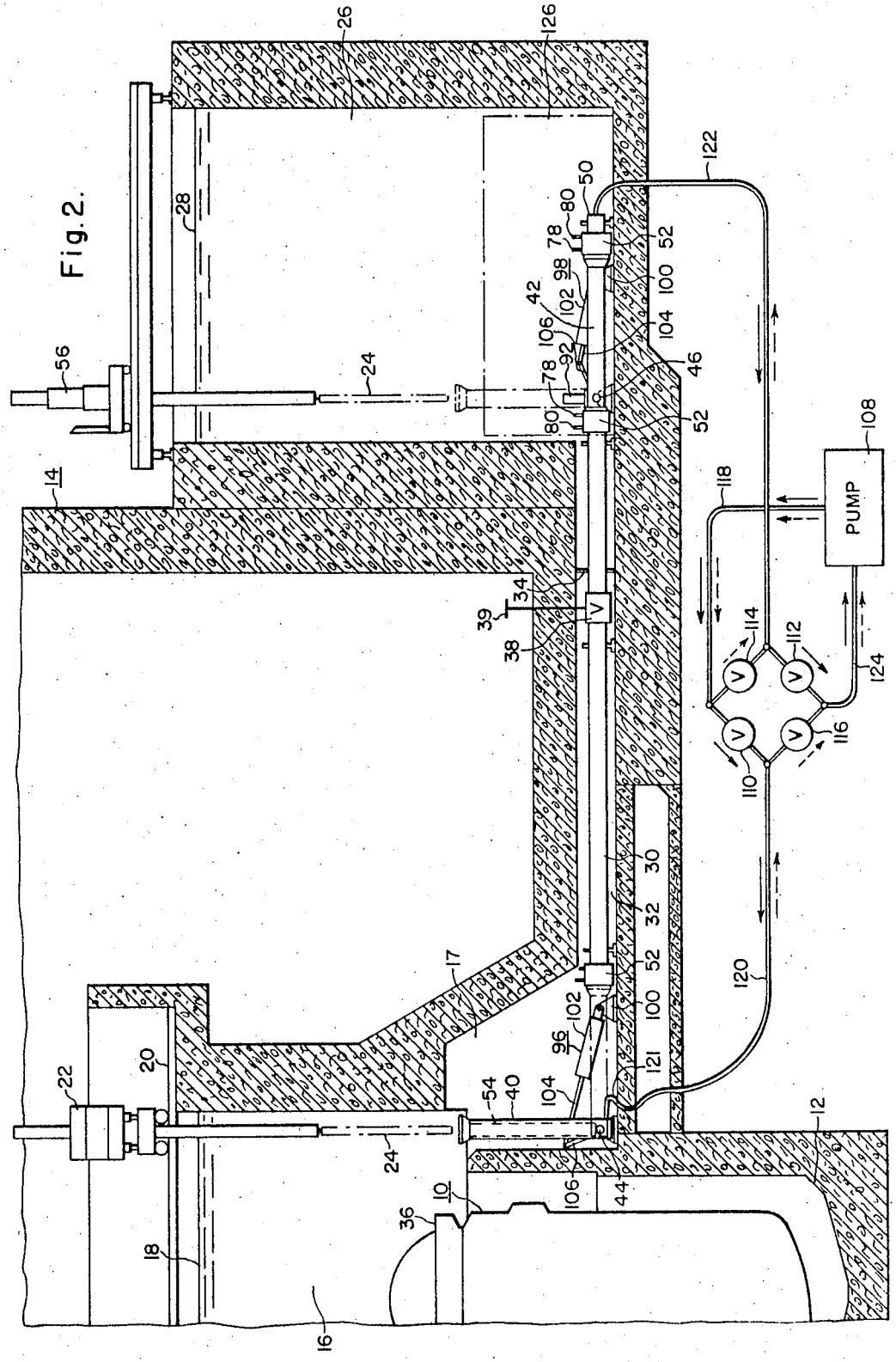

United States Patent Office 3,298,746
Patented Jan. 17, 1967

3,298,746
MATERIAL HANDLING APPARATUS
Walter E. Desmarchais, Pittsburgh, Pa., and Hjalmar
W. P. Stanhope, Cleveland, Ohio, assignors to Westinghouse Electric Corporation, East Pittsburgh, Pa., a corporation of Pennsylvania
Filed Feb. 20, 1964, Ser. No. 346,298
8 Claims. (Cl. 302—2)

This invention relates to apparatus for handling and transferring components from one location to another location, and more particularly to apparatus for efficiently and safely transferring irradiated reactor components from the plant enclosure of a nuclear reactor to an external storage pit.

In the operation of nuclear reactors it is common to provide adjacent to the reactor pit a fuel pit containing water and sunk into the earth for the handling and storage of reactor components, such as control rods or fuel assemblies, which may be highly radioactive. For example, in the refueling of a reactor, irradiated or spent fuel assemblies are transferred from the reactor pit to the fuel pit for temporary stoage. This transfer is accomplished underwater to protect the operators from the effects of radiation.

A system heretofore used to transfer reactor components to the fuel storage pit utilizes a transfer canal, which is a tank structure extending through the wall of the plant enclosure. Reactor components, such as fuel assemblies and/or control rods, are placed into the tank in a vertical position through a valve in the refueling canal side and thereafter shuttled through the transfer tank to the fuel storage pit on a chain drive mechanism. However, since fuel assemblies are becoming very long in large plants, the vertical transfer system heretofore used becomes impractical because of the height requirement for the transfer tank.

Accordingly, it is the general object of this invention to provide a new and improved apparatus for transferring components from one compartment to another compartment.

It is a more particular object of this invention to provide a new and improved apparatus for transferring reactor components such as fuel assemblies and control rods from the plant enclosure of a nuclear reactor to an external fuel storage pit.

Another object of the invention is to provide apparatus for transferring reactor components from a neutronic reactor to a fuel storage pit in which the components are conveyed in a substantially horizontal position through a horizontal means of relatively small cross-sectional area.

A further object of the invention is to provide apparatus for hydraulically transferring components from the fuel storage pit into the plant enclosure through a horizontal transfer tube of relatively small cross-sectional area.

A still further object of this invention is to provide apparatus for transferring reactor components from one compartment to another compartment in which the penetration through the compartments is materially reduced, the complexity of the transfer system is also reduced, and the high initial cost of the system is considerably lowered.

A still further object of this invention is to provide apparatus of the type described in which the liquid in the refuelng compartment is normally kept isolated from the liquid in the fuel storage pit.

Briefly, the present invention accomplishes the above-cited objects by providing a substantially horizontally-extending transfer tube containing a gate valve. The gate valve is normally closed to maintain the integrity of the plant enclosure and to isolate the liquid, such as borated water, in the refueling compartment from the liquid, such as demineralized water, in the fuel storage pit. In this example, borated water is specified because of its use in shutting down the reactor, and demineralized water is used because of its cleanliness. It is to be understood, however, that this invention can be used with other types of liquids. At either end of the transfer tube, within the plant enclosure and the fuel storage pit respectively, are cylindrical tilting devices rotatable between horizontal positions, where they are aligned with opposite ends of the transfer tube, and generally vertical positions, where a reactor component such as a fuel assembly or control rod may be inserted therein or removed therefrom. In one typical operation, the tilting device in the refueling compartment portion of the plant enclosure is initially rotated to a vertical position and a reactor component, such as an irradiated fuel assembly, is deposited therein. Thereafter, the tilting device and fuel assembly are rotated into alignment with the transfer tube, the gate valve is opened, and the fuel assembly is hydraulically transferred through the transfer tube to the tilting device in the fuel storage pit. Finally, this latter-mentioned tilting device is rotated into a vertical position where the fuel assembly may be elevated out of the second tilting device and deposited in a storage rack within the fuel storage pit. All of the aforementioned operations are carried out beneath the surface of a protective liquid such as water.

Preferably, the system includes a carrier movable on rollers or the like and having a piston at one end. The carrier is contained within the transfer tube and is reciprocable between the aforesaid tilting devices at either end thereof. When the carrier is in the tilting device within the plant enclosure, it is rotated into a vertical position wherein it receives a reactor component. Thereafter, the carrier is rotated into a horizontal position along with the tilting device wth the latter being hydraulically sealed to the transfer tube. The carrier is hydraulically sealed to a substantial degree to a transfer tube by means of the piston secured to one end of the carrier. Thereafter, a hydraulic force is utilized to move the carrier, with a reactor component therein, from the plant enclosure through the transfer tube to the tilting device in the fuel storage pit. At this point the tilting device, carrier, and reactor component are rotated into a vertical position, and the reactor component is removed from the carrier for storage elsewhere.

The carrier may also be used to transport reactor components from the fuel storage pit to the refueling compartment within the plant enclosure by using a reverse procedure to the one described above. In this instance the hydraulic force is applied to the piston in a reverse direction so as to move the carrier from the fuel storage pit to the plant enclosure.

Further objects, features and advantages of the invention will become apparent as the following description proceeds wherein features of novelty, which characterize the invention, will be pointed out witth particularity.

For a better understanding of the invention, reference may be had to the accompanying drawings in which:

FIG. 2 is a vertical section of the nuclear reactor installation of FIG. 1 taken substantially along line II—II and showing a portion of the refueling compartment, a portion of the plant enclosure, and the fuel storage pit;

Figure 1:
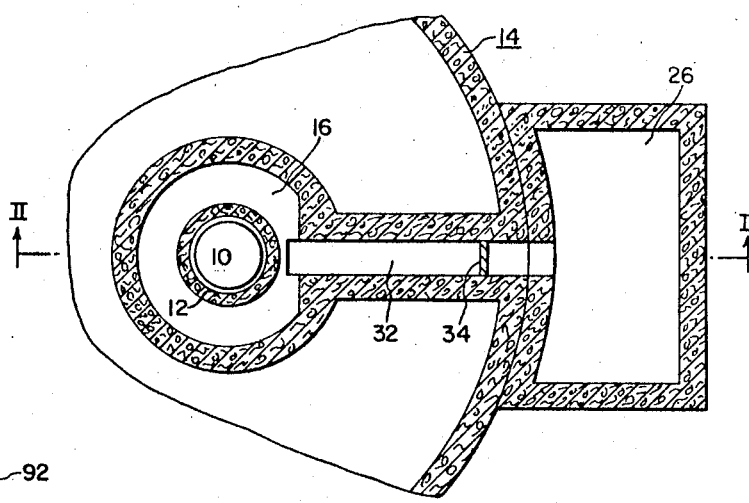
FIGURE 1 is a schematic section showing the path to be followed by the transfer of a reactor component from the reactor to the fuel storage pit.

Referring now to the darwings, and particularly to FIGS. 1 and 2, a nuclear reactor 10 is supported within a concrete reactor compartment 12. The reactor compartment 12 forms part of a concrete enclosure 14 which also includes a refueling compartment 16 above the reactor 10. During refueling of the reactor 10, the refueling compartment 16 is filled with water up to a level, generally indicated at 18, for personnel protection. However, during normal operation of the reactor 10, the liquid is drained from the refueling compartment 16. At the top of the refueling compartment 16 are tracks 20 which carry, for reciprocating movement, a manipulator crane 22. The purpose of the manipulator crane 22 is to remove or insert reactor components, such as fuel assemblies or control rods, relative to the reactor 10 and to a tilting device 40 with one of such fuel assemblies being schematically illustrated as 24.

Outside of the enclosure 14 adjacent thereto or at some distance therefrom is a fuel storage pit or compartment 26, also constructed with concrete walls and filled with water up to a level indicated at 28. It is necessary in refueling a nuclear reactor to transfer the irradiated fuel assemblies from the enclosure 14 to the fuel storage pit 26 underneath a specific depth of water as illustrated in FIG. 2. The system of the invention for accomplishing this purpose includes a conduit or transfer tube 30, which is preferably of type 304 stainless steel and having, in one illustrative embodiment of the invention, a diameter of about 20 inches. The transfer tube 30 is disposed inside passage 32 with the ends of the transfer passage connected to the refueling compartments 16 and the fuel storage pit 26 respectively. In this embodiment of the invention the region 17 shown to the left of transfer passage 32 and in which is located tilting device 40 is to be considered as part of the refueling compartment 16. A plate 34 is disposed transversely in the transfer passage 32 to separate the water in the refueling compartment 16 from the water in the fuel storage pit 26. The transfer tube 30 runs horizontally through the transfer passage 32 and through the plate 34 and is sealably welded to the aforementioned plate 34. The refueling compartment 16, the transfer passage 32 and the fuel storage pit 26 are lined with stainless steel plates, which are not shown herein for purposes of simplicity. Also not shown for purposes of simplicity is an annular refueling cover which is installed after the reactor head 36 is removed from the reactor 10. The refueling cover, not shown, extends from the top of the reactor compartment 12 to the top of the open reactor 10. This prevents the water in the refueling compartment 16 from entering the reactor compartment 12 during the refueling interval.

In the transfer tube 30 is installed a gate valve 38, which is normally closed but which can be opened remotely by any suitable means within the skill of the art and, therefore, not shown herein. However, a valve stem and handle 39 for valve 38 are shown sealably extending into the interior of enclosure 14 from transfer passage 32 for manual operation of valve 38. The gate valve 38 is utilized for the purpose of isolating the water in the refueling compartment 16 from the water in the fuel storage pit 26. Two tilting devices 40 and 42 are provided in the refueling compartment 16 and the fuel storage pit 26, respectively. The tilting device 40 is rotatable about a horizontal axis 44 from the vertical full line position shown to a generally horizontal position shown in phantom by a dot-dash outline where it is aligned with the transfer tube 30. In a similar manner, the tilting device 42 is rotatable about a generally horizontal axis 46 between the horizontal position shown in full lines, where it is aligned with the transfer tube 30 at the other end thereof, to a vertical position shown in phantom by a dot-dash outline. Any suitable means may be utilized for rotating the tilting devices 40 and 42, such as rotating devices 96 and 98, respectively, which provide the rotating force and will be described in detail hereinafter.

Aligned with the transfer tube 30 is a short conduit pipe section 50 in the fuel storage pit 26. The short pipe section 50 is spaced from the end of the transfer tube 30 by a distance substantially equal to the length of the tilting device 42. Opposite the ends of the tilting device 42 are hydraulic seals 52, which are adapted to seal the tilting device 42 to the short pipe section 50 and to the right end of the transfer tube 30, as will hereinafter be explained in greater detail. The tilting device 40, however, has only one hydraulic seal 52 located at the left end of the transfer tube 30, because the end of the tilting device 40 farthest away from the transfer tube 30 is a sealably closed end and does not require the hydraulic seal 52.

It is to be understood that the tilting device 40 can also be constructed in the same manner as the tilting device 42 and would include a short pipe section, similar to pipe section 50, at the end of the tilting device 40 which is farthest away from the transfer tube 30. In this particular instance, however, a different embodiment to be described hereinafter has been incorporated into tilting device 40 than the embodiment incorporated in the tilting device 42.

Briefly, the operation of the system is such that the tilting device 40 is first rotated to a vertical position. A reactor component 24, such as a fuel assembly or a control rod, is then removed from the reactor 10 and carried by crane 22 to a position where the component can be deposited in the tilting device 40. Carried within the tilting device 40 is a roller mounted carrier 54, shown in dotted outline and hereinafter described in detail, which receives the reactor component 24. Thereafter, the tilting device 40 is rotated into a horizontal position where it is aligned with the transfer tube 30. In a similar manner, the tilting device 42 is also rotated into a horizontal position where it is in alignment with the transfer tube 30 and the short pipe section 50. Following this procedure, the sealing devices 52 are actuated to seal the tilting devices to the transfer tube 30 and to the short pipe section 50. Gate valve 38 is then opened by turning valve handle 39. In order to move the carrier 54, which received the reactor component 24, from the tilting device 40 to the tilting device 42, water under pressure is forced into the far left end of the tilting device 40 as viewed in FIG. 2, thereby causing the carrier to travel from left to right until the carrier 54 reaches the tilting device 42. Following this, the sealing devices 52 are disconnected from the tilting device 42; the tilting device 42 is rotated into the vertical position shown in phantom by a dot-dash line; and the component 24 is removed from the carrier 54 by means of a second manipulator crane 56. Finally, the tilting device 42 is rotated back into its horizontal position; the sealing devices 52 are actuated into sealing positions; and water under pressure is forced into the short pipe section 50 to force the carrier 54 from right to left as viewed in FIG. 2, until it reaches the tilting device 40 preparatory to a succeeding transfer operation.

Figure 3:
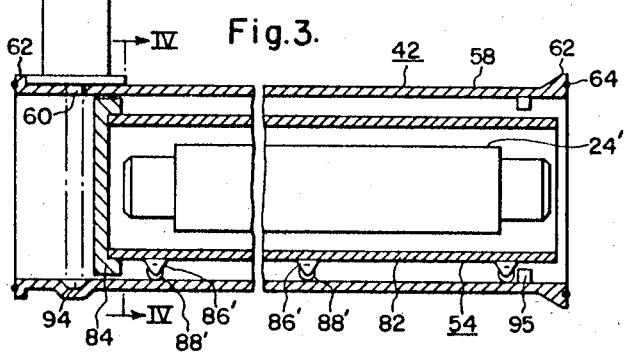
FIG. 3 is a partially broken away vertical section of the carrier utilized in accordance with the invention for transferring reactor components from the plant enclosure to the fuel storage pit and with the carrier disposed within the tilting device contained in the fuel storage pit.
Figure 4:
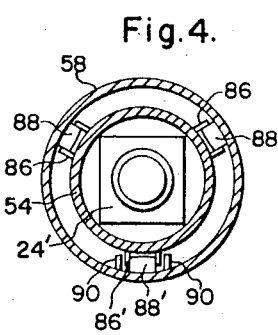
FIG. 4 is a cross-sectional view taken substantially along the line IV—IV of FIG. 3.

Referring now to FIGS. 3 and 4, the tilting device 42 is shown in detail and comprises a cylindrical casing 58, a pneumatically operated cylinder 92, and a stop ring 95 to be described hereinafter. At each end of the casing 58 is a flanged portion 62, which carries an O-ring seal 64 adapted to engage the end of a sliding sleeve 66 (as shown in FIG. 5) located on the short pipe section 50 or the transfer tube 30 as the case may be.

Figure 5:
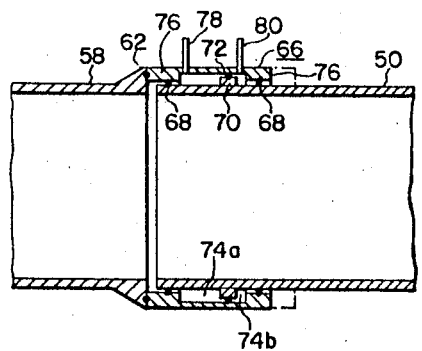
FIG. 5 is a partial longitudinal section taken through a typical sealing device illustrating the manner in which the hydraulic sealing device of the invention is moved between sealing and retracted positions.

Referring now to FIG. 5, the sliding sleeve 66 comprises end portions which are thickened and grooved to receive O-rings 68. An annular ring 70 is sealably secured to the outer periphery of the short pipe section 50. The ring 70 is grooved on its outer periphery to receive an O-ring 72. The sleeve 66 contains a recess 74 formed by the inwardly thickened end portions 76 of sleeve 66.

On either side of the annular ring 70, tubes 78 and 80 communicate with recess 74a and 74b respectively.

As shown in FIG. 5, the sleeve 66 is in its closed position and prevents leakage at the junction formed by casing 58 and short pipe section 50. Specifically, leakage is prevented by each of the aforementioned O-rings at their respective locations. To operate the sliding sleeve 66, fluid under pressure is injected through tube 80 into recess 74b. This produces a higher pressure in recess 74b than in 74a and forces the sleeve to the right as viewed in FIG. 5 into the phantom position shown by the dot-dash line. Simultaneously, the liquid trapped in recess 74a is forced out of recess 74a through tube 78 into an auxiliary system (not shown). In order to move the sleeve 66 into the closed position as shown in FIG. 5, a reverse procedure is used from the one explained heretofore.

Returning now to FIGS. 3 and 4, the carrier 54 is shown comprising a receptacle 82 and a piston 84 secured to the left end of the receptacle 82 as viewed in FIG. 3. In this example of the carrier, the receptacle 82 is tubular in shape; however, receptacle 82 can have another configuration such as rectangular. Extending radially outwardly from the outer periphery of the receptacle 82 and located 120° apart from each other are brackets 86 which carry rollers 88. Rollers 88 are crowned as shown in FIG. 4, whereby they will ride on the inner peripheral surface of the transfer tube 30 or tilting devices 40 and 42. If it is desirous to prevent the carrier 54 from rotating, rails 90 can be secured to the inner periphery of the casing 58 on either side of the bottom roller 88′ as shown in FIG. 4. Rails 90 extend throughout the length of each tilting device 40 and 42 as well as the transfer tube 30 and are broken at the junctions of the tilting devices and the transfer tube. In the event that the rails 90 are used it is possible to eliminate the upper brackets 86 and the two upper rollers 88 and retain only the bottom bracket 86′ and bottom roller 88′. It is understood that the rails may also be used in conjunction with the upper rollers. A loose fit will be maintained between the bottom brackets 86′ and the rails 90 in order to prevent binding of the brackets 86′ with the rails 90. It will also be appreciated that in this manner the bottom rollers 88′ support the carrier 54 for longitudinal movement through the tilting devices and the transfer tube, while the rails 90 laterally guide the carrier 54 along its path of travel.

The piston 84 is secured to the left end of the carrier 54 by any suitable means such as welding. Also a slight leakage can be permitted between the outer periphery of the piston 84 and the inner surface of the casing 58 while still permitting movement of the carrier 54 by the pressurized fluid acting on one side of the piston 84. As stated previously, the reactor component 24 is inserted into the carrier 54. One example of a reactor component contained within the carrier 54 is a fuel assembly 24′ shown in FIGS. 3 and 4.

Also shown in FIG. 3 is the plunger 60 and its associated pneumatic cylinder 92. The cylinder 92 is secured to the outer peripheral surface of the tubular casing 58 by any suitable means such as welding. In addition, the cylinder 92 and its plunger 60 is located at the left end of casing 58 as viewed in FIG. 3. The plunger 60 in this instance is used to prevent the carrier 54 from sliding out of tilting device 42, when the tilting device 42 is rotated to its vertical position. As shown in FIG. 3 the plunger 60 is in its retracted position with its end in line with or outside the inner surface of casing 58, in order to permit the piston 84 to pass by the plunger 60 during the movement of the carrier 54 back and forth within the transfer system. After the carrier 54 has been positioned within the tilting device 42, the plunger 60 is projected along the path indicated by the dot-dash line in FIG. 3 into a recess 94 at the lower left end of casing 58 and directly opposite the plunger 60. Thus, the plunger 60, which is operated by means of the cylinder 92, is supported on diagonally opposite locations by the casing 58 and prevents the carrier 54 from sliding beyond the location of the projected plunger 60. In addition a stop ring 95 is secured to the inner periphery of casing 58 to act as a stop for carrier 54. Ring 95 is located at the right end of casing 58 and makes contact with the set of rollers 88 at the right end of carrier 54.

The tilting device 40 is similar to tilting device 42, except that tilting device 40 does not have the cylinder 92, the plunger 60, one of the flanged portions 62 and the recess 94. In addition, tilting device 40 is closed on its left end as viewed in FIG. 1. In the case of tilting device 40 the carrier 54 is maintained within the tilting device 40 by the force of gravity. It is understood, however, that tilting device 40 could be built in exactly the same manner as tilting device 42 with the latter's associated cylinder 92 and plunger 60. However, a sealing device 52 and a short pipe section 50 will then have to be included to the left of the horizontal axis 44 of tilting device 40 so as to have an end arrangement which is similar to the end arrangement of tilting device 42.

As shown in FIG. 2 tilting devices 40 and 42 are rotated by means of rotating devices 96 and 98 respectively. Rotating devices 96 and 98 are constructed in the same manner and each comprises an end support 100, a hydraulic cylinder 102, a plunger 104, and an arm 106. As viewed in FIG. 2, cylinder 102 is pivotally mounted at its right end to end support 100. Plunger 104 is then pivotally connected at its left end to the arm 106. The other end of arm 106 is then fixed to one of the tilting devices 40 and 42 at one of the horizontal axis 44 and 46 respectively. Thus, when the rotating devices 96 and 98 are operated by projecting the plunger 104 outwardly from the cylinders 102, it causes the arms 106 to rotate through an arc of 90° about the horizontal axis 44 and 46 so as to move the tilting devices 40 and 42 from a horizontal position to a vertical position. It is understood that each of the tilting devices can be operated seperately by means of their associated rotating devices. Furthermore, the position of the various components of the rotating devices 96 and 98 are shown for a tilting device in its upright position and a tilting device in its horizontal position at the left end and right end, respectively, of the transfer system as viewed in FIG. 2.

Referring again to FIG. 2, the operation of the system is as follows with the understanding that suitable electrical and hydraulic controls can be provided within the skill of the art for effecting the operation either automatically, semi-automatically or manually. Initially it will be assumed that the carrier 54 is within tilting device 40 and that both tilting devices 40 and 42 are in a horizontal position in alignment with the transfer tube 30 with all sealing devices 52 engaged with the tilting devices 40 and 42. The sealing device 52 adjacent tilting device 40 is first disengaged. Tilting device 40 is then rotated to a vertical position about axis 44 in a counterclockwise direction by rotating device 96. The open right end of the carrier 54 as viewed in FIG. 3 is now located at the top of the tilting device preparatory to receiving a reactor component 24.

After the tilting device 40 is thus positioned, a reactor component 24, such as a fuel assembly, is removed from the reactor 10 by means of the manipulator crane 22 and placed into the carrier 54. It is assumed, of course, that the reactor head 36 has been previously removed from the reactor 10 so as to permit the removal of the reactor component 24 from the reactor 10. Tilting device 40 is then rotated about axis 44 in a clockwise direction by the rotating device 96 until it is aligned with the transfer tube 30. In this example of the invention the force of gravity is utilized to keep the carrier 54 and the reactor component 24 inside the tilting device 40.

As tilting device 40 is now aligned with the transfer tube 30, the sealing device 52 adjacent tilting device 40 is then actuated to force the sliding sleeve 66 (FIG. 5) into engagement with flanged portions 62 (FIG. 5) so as to completely seal the transfer system. Following this, gate valve 38 is opened so as to provide an uninterrupted sealed conduit from the left end of tilting device 40 to the short pipe section 50. Furthermore, plunger 60 is checked to make certain that it is in its retracted position to permit the passage of carrier 54 into tilting device 42 to a position beyond the plunger 60.

In the exemplary embodiment of this invention shown in FIG. 2 the pressurized fluid is supplied to the transfer system by means of an auxiliary pumping system which is shown in schematic form in FIG. 2. The pumping system comprises valves 110, 112, 114 and 116, pump 108, and interconnecting piping which couples the aforementioned components to the extreme ends of the transfer system. It is to be noted that line 120, which couples valves 110 and 116 to the left end of tilting device 40 contains a flexible section 121 within the transfer passage 32 in order to permit the rotation of tilting device 40 through a 90° arc without rupturing line 120.

At this time it is assumed that the valves 110, 112, 114 and 116 are closed and that pump 108 is shut down. Valves 110 and 112 are now opened and pump 103 is started. The pump 108 pumps a liquid, such as water, under pressure through the pump discharge conduit 118, through valve 110, and through conduit 120 into the left end of the tilting device 40. The water enters the interior of tilting device 40 between the left end of device 40 and the piston 84 (FIG. 3) secured to the left end of carrier 54. In this manner, it can be seen that the force of the pressurized water causes the carrier 54 to move on rollers 88 (FIG. 3) from left to right as viewed in FIG. 2 until it reaches the tilting device 42 in the fuel storage pit 26, where the rollers 88 at the right end of carrier 54 abut against the annular ring 95 (FIG. 3) so as to position the carrier 54 within the tilting device 42. As the carrier 54 moves from left to right through the transfer tube 30, the water to the right of the carrier 54 is exhausted from the short pipe section 50 into the conduit 122 which is coupled to the right end of the short pipe section 50. The water then flows through valve 112, through pump inlet line 124, and into the pump 108.

After the carrier 54 is positioned within the tilting device 42, the pump 108 is stopped and valves 110 and 112 are closed. Cylinder 92 is then actuated to force its associated plunger 60 (FIG. 3) across the diameter of casing 58 into the recess 94 (FIG. 3), so as to lock the carrier 54 in place to prevent the carrier 54 from rolling out of the tilting device 42 when device 42 is rotated into a vertical position. The sliding sleeve 66 (FIG. 5) at each end of tilting device 42 is then actuated as previously explained so as to break the hydraulic seal which each sliding sleeve 66 had previously made with the ends of tilting device 42. The tilting device 42 is then rotated in a counterclockwise direction about axis 46 until device 42 reaches a vertical position. The fuel assembly 24 is then removed by the second manipulator crane 56 and placed in the fuel storage rack 126 indicated by dot-dash lines in the fuel storage pit 26. However, the fuel assembly can also be completely removed from the fuel storage pit 26 and stored in another location.

After the removal of the fuel assembly from the tilting device 42, the latter is rotated in a clockwise direction until it is again aligned with the transfer tube 30 and the short pipe section 50. The sealing devices 52, located at each end of the tilting device 42, are then actuated so as to seal the tilting device 42 to the transfer tube 30 and to the short pipe section 50. Cylinder 92 is then actuated to withdraw plunger 60 (FIG. 3) from the interior of tilting device 42. At this point, valves 114 and 116 are opened and pump 108 started. Pressurized water then flows from the pump 108 through the pump discharge line 118, through valve 114, and through conduit 122 into the short pipe section 50 where the pressurized water then acts against the right face of the piston 84 (FIG. 3). This action then forces the carrier from right to left as viewed in FIG. 2. As the carrier 54 moves to the left, water is forced from the left end of the tilting device 54 through conduit 120, through valve 116, through pump inlet conduit 124 and into the pump 108. When the carrier 54 abuts against the left end of tilting device 40, pump 108 is stopped and valves 114 and 116 are closed. Gate valve 38 is then closed, and the fuel transfer system is ready to repeat another cycle.

It can be readily seen that the procedure described above can be used in reverse. Thus, a reactor component can be inserted into tilting device 42 and transferred into tilting device 40; whereupon the component can be removed from tilting device 40 and be inserted to the reactor 10.

In the procedures described above, it will be appreciated that some of the liquid from the plant enclosure 14 will be mixed with some of the liquid from the fuel storage pit 28 and circulated through the fuel transfer system. Although it is desirable to minimize this as much as possible, the amount of mixing does not present a problem due to the small amount of water that is mixed from the two aforementioned areas.

While there have been shown and described what are at present considered to be the preferred embodiments of the invention, modifications thereto will readily occur to those skilled in the art. For example, the cross-sectional shape of the transfer system can be other than tubular, such as rectangular. Furthermore, the cross-sectional shape of the receptacle 82 (FIG. 3) can differ from the remainder of the system. Also the carrier 54 can be removed from the transfer ssytem and loaded with a component outside of the transfer system. The carrier with its component can then be inserted into the transfer system. If the need arises, additional supporting means can be secured to the interior of carrier 54 in order to provide any additional support that is required by the component being transferred within the transfer system.

It is not desired, therefore, that the invention be limited to the specific arrangements shown and described. However, it is intended to cover in the appended claims all such modifications as fall within the true spirit and scope of the invention.

We claim as our invention:

1. Apparatus for handling a component comprising a compartment capable of holding a liquid, another compartment also capable of holding a liquid, conduit means for connecting said compartments at the lower portions thereof, a first tilting device in one of said compartments rotatable about a generally horizontal axis between a substantially vertical position whereat said reactor component can be inserted and withdrawn and a substantially horizontal position whereat said first tilting device is aligned with said conduit means, a second tilting device disposed in the other of said compartments rotatable about a generally horizontal axis between a substantially vertical position whereat said component can be inserted and withdrawn and a substantially horizontal position whereat said second tilting device can be aligned with said conduit means, and means for hydraulically forcing said component when inserted in one of said tilting devices through the conduit means to the other of said tilting devices where said last-mentioned tilting device and said component can be rotated into a substantially vertical position from which said component can be withdrawn.

2. The combination of claim 1 including only a single gate valve means in said conduit means, and said gate valve means being normally closed to isolate said compartments from one another.

3. The combination of claim 1 including a carrier capable of receiving said component and disposed for reciprocating movement within said conduit means and between said compartments, said carrier comprising an elongated receptacle, a piston at one end, and roller means spaced around the periphery of said receptacle to center said receptacle within said conduit means; and a pair of rails extending parallelly throughout the conduit means and sufficiently spaced laterally from one another to permit at least one of said roller means to operate between said rails so as to guide the carrier laterally throughout the conduit means.

4. Apparatus for handling and transporting radioactive reactor components including an elongated fuel assembly comprising a plant enclosure capable of holding a shielding liquid, an external fuel storage pit also capable of holding a shielding liquid, a horizontal tube means for connecting the fuel storage pit and plant enclosure at the lower portions thereof, a tilting device in the plant enclosure rotatable about a generally horizontal axis between a substantially vertical position whereat said fuel assembly can be inserted and a substantially horizontal position whereat said tilting device can be aligned with said tube means, a seal actuated to a sealing position whereby the periphery of the open end of the tilting device is sealed to the periphery of the tube means adjacent said open end when said tilting device and said tube means are aligned with one another, and means for forcing liquid under pressure into said tilting device to thereby move said fuel assembly deposited in the tilting device through the tube means to the fuel storage pit.

5. Apparatus for handling and transporting a reactor component comprising a compartment capable of holding a liquid, another compartment adjacent to said compartment also capable of holding a liquid, a first conduit means extending substantially horizontally for connecting said compartments at the lower portions thereof, a first tilting device in one of said compartments rotatable about a generally horizontal axis between a substantially vertical position whereat said component can be loaded and unloaded and a substantially horizontal position whereat said first tilting device can be aligned with said first conduit means, said first tilting device having the end opposite the first conduit means sealably closed, a second tilting device in the other of said compartments rotatable about a generally horizontal axis between a substantially vertical position whereat said component can be loaded and unloaded and a substantially horizontal position whereat said second tilting device can be aligned with said first conduit means at the end thereof opposite said first tilting device, a second conduit means aligned with said first conduit means and positioned at the end of said second tilting device opposite said first conduit means when the second tilting device is in a substantially horizontal position, said second conduit means having one end open and the other end closed with the open end adjacent said tilting device, means for hydraulically sealing the open end of said second conduit means to the open end of said second tilting device adjacent said second conduit means, means for hydraulically sealing the remaining open ends of the first and second tilting devices to the first conduit means, and means for forcing liquid under pressure into one of said tilting devices while withdrawing liquid from the other of said tilting devices to thereby move said component deposited in said one tilting device through the first conduit means to said other tilting device.

6. The combination of claim 5 including a carrier reciprocable between said tilting devices and capable of receiving said component and wherein said pressurized liquid is simultaneously supplied into one of said tilting devices while liquid is withdrawn from the other of said tilting devices by means of a closed pumping system coupled to said tilting devices.

7. Apparatus for handling and transporting a reactor component comprising a compartment capable of holding a liquid, another compartment adjacent to said compartment capable of holding a liquid, a first conduit means extending substantially horizontally for connecting said compartments at the lower portions thereof, a first pivotal means in one of said compartments rotatable into alignment with said first conduit means, said first pivotal means having one end open and the other end sealably closed and being pivoted at said sealably closed end located opposite said first conduit means, a second pivotal device in the other of said compartments rotatable into alignment with said first conduit means, said second pivotal means having both ends open and being pivoted at the end adjacent said first conduit means, a second conduit means aligned with said first conduit means and positioned at the end of said second pivotal means opposite said first conduit means, said second conduit means having one end open and the other end closed with the open end adjacent said second pivotal means, a sleeve surrounding each open end of the said conduit means, means for sliding each of said sleeves over the ends of said conduit means to provide a hydraulic seal between the conduit means and the pivotal means when one of said conduit means is in alignment with its associated pivotal means, a carrier capable of receiving said component and capable of reciprocating movement within said first conduit means between said compartments, said carrier comprising an elongated receptacle, a piston at one end, roller means spaced around the periphery of said receptacle to center said receptacle within said first conduit means, a pair of rails extending throughout the first conduit means and sufficiently spaced from one another to permit at least one of said roller means to operate between said rails so as to guide the carrier laterally throughout the first conduit means, a pair of rails in each of said pivotal means, said rails being in alignment with the rails in said first conduit means, a stopping means at the ends of the pivotal means opposite said first conduit means, a retractable holding means in said second pivotal means located at the end of said second pivotal means adjacent said first conduit means to hold the carrier within said second pivotal means during the rotation of said second pivotal means with said carrier therein, means for loading and unloading said component into said carrier, and means for hydraulically moving said carrier between said compartments.

8. Apparatus for transporting a component comprising a compartment capable of holding a liquid, another compartment capable of holding a liquid, a liquid in at least one of said compartments, conduit means extending between said compartments and communicable therewith, said conduit means disposed generally below the level of said liquid, a movable aligning means in each of said compartments, a seal in each of said compartments actuated to the sealing position when the aligning means and the conduit means are aligned with one another, means for conveying said component from one aligning means through said conduit means to said other aligning means, and pumping means for simultaneously supplying pressurized liquid into one of said aligning means while withdrawing liquid from the other of said aligning means to thereby move said conveying means between said aligning means.

References Cited by the Examiner

UNITED STATES PATENTS

| | | | |
|---|---|---|---|
| 2,803,601 | 7/1957 | Cooper | 172—32 |
| 2,870,075 | 1/1959 | Leverett | 176—32 |
| 2,875,345 | 2/1959 | Nicoll. | |
| 2,940,915 | 6/1960 | Hammond | 176—32 |
| 3,128,963 | 4/1964 | Erkes | 243—1 |

ANDRES H. NIELSEN, *Primary Examiner.*